(12) United States Patent
Salcone

(10) Patent No.: US 8,860,250 B2
(45) Date of Patent: Oct. 14, 2014

(54) PORTABLE POWER DEVICES AND METHODS OF SUPPLYING POWER

(75) Inventor: Michael D. Salcone, Newton, NJ (US)

(73) Assignee: Advanced Power Concepts LLC, Newton, NJ (US)

( * ) Notice: Subject to any disclaimer, the term of this patent is extended or adjusted under 35 U.S.C. 154(b) by 483 days.

(21) Appl. No.: 13/240,556

(22) Filed: Sep. 22, 2011

(65) Prior Publication Data

US 2012/0112544 A1 May 10, 2012

Related U.S. Application Data

(60) Provisional application No. 61/385,581, filed on Sep. 23, 2010, provisional application No. 61/501,810, filed on Jun. 28, 2011.

(51) Int. Cl.
| | |
|---|---|
| H02J 7/00 | (2006.01) |
| H02J 9/04 | (2006.01) |
| H02J 9/06 | (2006.01) |
| H02J 7/35 | (2006.01) |
| H02J 7/34 | (2006.01) |
| H02J 3/38 | (2006.01) |

(52) U.S. Cl.
CPC ....... *H02J 7/0047* (2013.01); *H02J 2007/0049* (2013.01); *H02J 3/386* (2013.01); *H02J 7/35* (2013.01); *H02J 9/062* (2013.01); *Y02B 10/72* (2013.01); *Y02B 10/14* (2013.01); *H02J 2007/005* (2013.01); *Y02E 10/563* (2013.01); *Y02E 10/566* (2013.01); *H02J 3/383* (2013.01); *Y02E 10/763* (2013.01); *H02J 7/34* (2013.01)

USPC .......................................................... 307/65

(58) Field of Classification Search
CPC ................ H02J 7/00; H02J 9/00; H02J 9/04; H02J 9/06
USPC .......................................................... 307/65
See application file for complete search history.

(56) References Cited

U.S. PATENT DOCUMENTS

| | | | | |
|---|---|---|---|---|
| 6,998,821 | B2 * | 2/2006 | Sakai et al. | 320/138 |
| 7,408,432 | B2 * | 8/2008 | Shi | 335/17 |
| 7,573,232 | B2 * | 8/2009 | Cheng et al. | 320/115 |
| 2010/0253519 | A1 * | 10/2010 | Brackmann et al. | 340/572.1 |
| 2010/0301799 | A1 * | 12/2010 | Lin et al. | 320/101 |
| 2011/0304295 | A1 * | 12/2011 | McNally | 320/101 |

* cited by examiner

*Primary Examiner* — Hal Kaplan
(74) *Attorney, Agent, or Firm* — Proskauer Rose LLP

(57) ABSTRACT

A portable power supplying system includes an enclosure including at least one wheel mounted to a bottom portion of the enclosure, a battery secured within the enclosure, and a battery charger secured within the enclosure. The battery charger is electrically connected to the battery for charging the battery. The system further includes a DC/AC inverter secured within the enclosure. The DC/AC inverter is electrically connected to the battery, and is configured to convert a direct current supplied by the battery to an alternating current. The system further includes a power outlet including at least one female household electrical connection, and a transfer switch secured within the enclosure. The transfer switch is electrically connected to the DC/AC inverter, the battery charger, the power outlet and a power source input.

19 Claims, 16 Drawing Sheets

PORTABLE POWER DEVICES AND METHODS OF SUPPLYING POWER

RELATED APPLICATIONS

This application claims the benefit of U.S. Provisional Application No. 61/385,581, filed Sep. 23, 2010, and U.S. Provisional Application No. 61/501,810, filed Jun. 28, 2011, the contents of each being herein incorporated by reference in their entirety.

TECHNICAL FIELD

The present inventive concepts generally relate to power supplying devices and methods of supplying power, and more particularly, to portable power supplying devices and methods of portably supplying power.

BACKGROUND

Generally, portable power offerings readily available in the marketplace are limited to combustion engine generators and the like. However, combustion engine generators are noisy and require setup in well-ventilated spaces due to carbon monoxide output. Other types of power supply devices, such as uninterruptible power sources, provide power for computers and peripherals during power interruptions for short periods of time. Such power supply devices are difficult to move due to their construction, and typically provide power for only a few minutes so that computers and peripherals can be safely powered down.

SUMMARY

Embodiments of the present inventive concepts are directed to portable power systems and devices that can provide household power to common household appliances, when household power, for example, household power supplied from a power grid, is not readily available. In some embodiments, portable power devices and systems are packaged in an enclosure that has wheels and an extending handle similar to luggage so that the devices and systems can be easily portable. In some embodiments, the system's weight is such that one person would be able to transport the system. The system can be battery powered and can be charged by standard household power, a generator, a solar panel, a wind powered source or any power generation source that is available. The device can also have the capability, that if it were connected to an alternate power source, such as, a solar panel, a wind-powered generator, or other power generation source, any excess power after the battery is fully charged could be sent back to the household power circuit and/or household power grid via the household power connection.

In one aspect, a portable power supply system, comprises: a movable enclosure; a battery secured within the enclosure; a battery charger secured within the enclosure, the battery charger electrically connected to the battery for charging the battery; a DC/AC inverter secured within the enclosure, the DC/AC inverter electrically connected to the battery and configured to convert a direct current supplied by the battery to an alternating current; a power outlet including at least one household electrical connection; and a transfer switch secured within the enclosure, the transfer switch being electrically connected to the DC/AC inverter, the battery charger, the power outlet and a power source input, wherein when household power is supplied to the power source input, the transfer switch is configured to supply the household power to the battery charger and the power outlet, and when the household power is unavailable at the power source input, the transfer switch is configured to supply the alternating current generated by the DC/AC inverter to the power outlet.

In some embodiments, the enclosure further comprises at least one wheel mounted to a bottom region of the enclosure and an extendable handle disposed at an upper region of the enclosure.

In some embodiments, the portable power supply system further comprises a power and run time display that is configured to display a current power output level of the portable power supplying system and an estimated full battery charge run time of the portable power system simultaneously.

In some embodiments, the power and run time display includes a plurality of light emitting devices arranged between a power output marker and a full charge run time marker, the power output marker including a plurality of non-linear power output level markers, and the full charge run time marker including a plurality of non-linear full charge run time level markers.

In some embodiments, the power and run time display includes a battery charge indicator configured to indicate a current charge of the battery, the battery charge indicator including a plurality of light emitting devices that are each arranged to correspond with one of a plurality of battery charge level markers.

In some embodiments, the alternating current generated by the DC/AC inverter is a household alternating current.

In some embodiments, the household alternating current is a 60 hertz alternating current.

In some embodiments, the household alternating current is a 50 hertz alternating current.

In some embodiments, the power outlet is secured to the enclosure such that the at least one household electrical connection is accessible from a front panel of the enclosure.

In some embodiments, the at least one household electrical connection comprises a first female household electrical connection and a second female household electrical connection.

In some embodiments, the power outlet is a GFI household power outlet.

In some embodiments, the power input source comprises a male 3-prong electrical connector secured to the enclosure.

In some embodiments, the portable power supply device of claim 12 further comprising a power cord electrically connected to the male 3-prong electrical connector.

In some embodiments, the power input source comprises a power cord.

In some embodiments, the battery has an amp/hour rating between the range of 50 amp/hours to 100 amp/hours.

In some embodiments, the battery has an amp/hour rating between the range of 20 amp/hours to 50 amp/hours.

In some embodiments, the portable power supply system further comprises: an alternative power source battery charger secured within the enclosure, the alternative power source battery charger electrically connected to the battery for charging the battery; and a renewable power generation source electrically connected to the alternative power source battery charger.

In some embodiments, the renewable power generation source comprises a solar panel.

In some embodiments, the renewable power generation source comprises a wind turbine.

In some embodiments, the portable power supply system further comprises a grid tied DC/AC inverter secured within the enclosure, the grid tied DC/AC converter electrically connected to the battery and the alternative power source battery charger so that the grid tied DC/AC inverter is capable of converting a direct current supplied by the battery or the alternative power source battery charger to an alternating current, and wherein the grid tied DC/AC inverter is configured to transfer excess power from the renewable power generation source to a household electrical grid connected to the power source input when the battery is fully charged.

In some embodiments, the portable power supply system further comprises at least one external battery electrically connected to the portable power supplying system via an electrical connector secured to the enclosure.

In some embodiments, the transfer switch comprises first through fourth relays, the first relay connected between a line output terminal of the DC/AC inverter and a line output terminal of the power outlet, the second relay connected between a neutral output terminal of the DC/AC inverter and a neutral output terminal of the power outlet, the third relay connected between a line output terminal of the power input source and the line output terminal of the power outlet, and the fourth relay connected between a neutral output terminal of the power input source and the neutral output terminal of the power outlet.

In some embodiments, the first relay comprises a first resistor and the third relay comprises a second resistor, and wherein the first resistor is less than the second resistor.

In another aspect, a method of switching between a primary power source and a standby power source, the method comprises: coupling a primary power source to a first input of a transfer switch; coupling a standby power source to a second input of the transfer switch; and connecting an output of the transfer switch to the primary power source when a live household current is detected at the first input, and connecting the output of the transfer switch to the standby power source when the live household current is not available at the first input.

In some embodiments, the live household current is a 60 hertz alternating current.

In some embodiments, the live household current is a 50 hertz alternating current.

In some embodiments, when the output of the transfer switch is connected to the standby power source an inverted current is provided by the standby power source at the second input.

In another aspect, a portable power supply system, comprises: a movable enclosure; a battery secured within the enclosure; a battery charger secured within the enclosure, the battery charger electrically connected to the battery for charging the battery; a DC/AC inverter secured within the enclosure, the DC/AC inverter electrically connected to the battery and the battery charger, the DC/AC inverter configured to convert a direct current supplied by the battery to an alternating current; a power outlet including at least one household electrical connection; an alternative power source battery charger secured within the enclosure, the alternative power source battery charger electrically connected to the battery for charging the battery; and a renewable power generation source electrically connected to the alternative power source battery charger.

In some embodiments, the renewable power generation source comprises a solar panel.

In some embodiments, the renewable power generation source comprises a wind turbine.

In some embodiments, the portable power supply system further comprises a grid tied DC/AC inverter secured within the enclosure, the grid tied DC/AC converter electrically connected to the battery and the alternative power source battery charger so that the grid tied DC/AC inverter is capable of converting a direct current supplied by the battery or the alternative power source battery charger to an alternating current, and wherein the grid tied DC/AC inverter is configured to transfer excess power from the renewable power generation source to a household electrical grid connected to the power source input when the battery is fully charged.

In another aspect, a power and run time display comprises: a plurality of light emitting devices arranged between a power output marker and a full charge run time marker, the power output marker including a plurality of non-linear power output level markers, and the full charge run time marker including a plurality of non-linear full charge run time level markers, wherein the power and run time display is configured to illuminate one of the plurality light emitting devices corresponding to one of the plurality of non-linear power output level markers and one of the plurality of non-linear full charge run time level markers so that a current power consumption level of a device and an estimated full battery charge run time of the device is simultaneously displayed to a viewer.

In some embodiments, the power and run time display includes a battery charge indicator configured to indicate a current charge of the battery, the battery charge indicator including a plurality of light emitting devices that are each arranged to correspond with one of a plurality of battery charge level markers.

In another aspect, a portable power supply system, comprises: a movable enclosure; a battery secured within the enclosure; a battery charger secured within the enclosure, the battery charger electrically connected to the battery for charging the battery; a DC/AC inverter secured within the enclosure, the DC/AC inverter electrically connected to the battery and configured to convert a direct current supplied by the battery to an alternating current; a power outlet including at least one household electrical connection; a transfer switch secured within the enclosure, the transfer switch being electrically connected to the DC/AC inverter, the battery charger, the power outlet and a power source input, wherein when household power is supplied to the power source input, the transfer switch is configured to supply the household power to the battery charger and the power outlet, and when the household power is unavailable at the power source input, the transfer switch is configured to supply the alternating current generated by the DC/AC inverter to the power outlet; and a power and run time display that is configured to display a current power output level of the portable power supplying system and an estimated full battery charge run time of the portable power system simultaneously, wherein the power and run time display includes a plurality of light emitting devices arranged between a power output marker and a full charge run time marker, the power output marker including a plurality of non-linear power output level markers, and the full charge run time marker including a plurality of non-linear full charge run time level markers, and wherein the power and run time display includes a battery charge indicator configured to indicate a current charge of the battery, the battery charge indicator including a plurality of light emitting devices that are each arranged to correspond with one of a plurality of battery charge level markers.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION OF EMBODIMENTS

Figure 1:
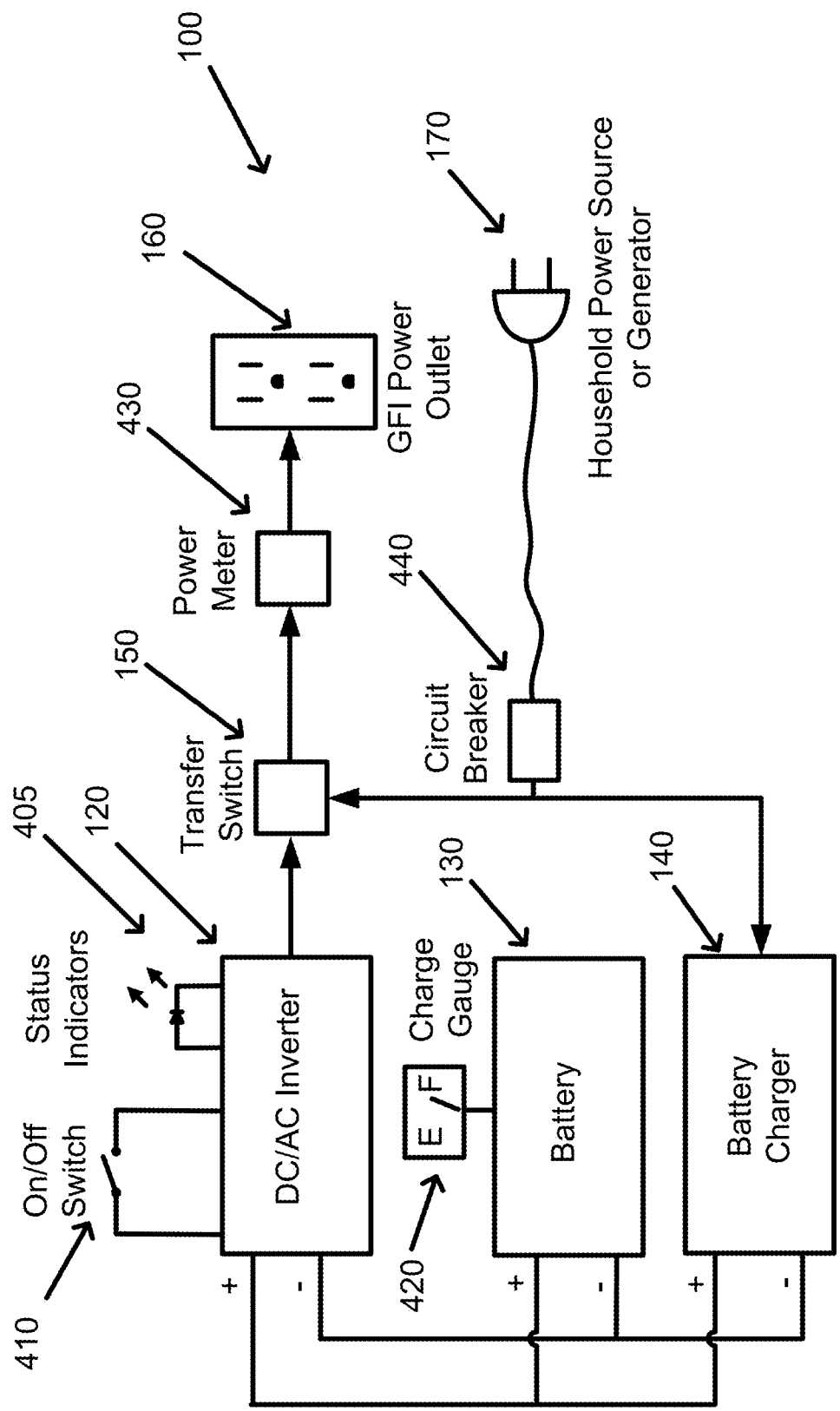
FIG. 1 is a block diagram of a portable power system, in accordance with embodiments of the present inventive concepts.

FIG. 1 is a block diagram of a portable power system, in accordance with embodiments of the present inventive concepts. A portable power system 100 can comprise a DC/AC inverter 120, a battery 130 or array of batteries, a battery charger 140, a transfer switch 150, a power outlet 160 or connector, and a power source input 170.

The portable power system 100 can be configured such that power terminals of the battery 130 are electrically connected to input terminals of the DC/AC inverter 120 and charging terminals of the battery charger 140. For example, in the exemplary portable power system 100 shown in FIG. 1, the positive input terminal of the DC/AC inverter 120, the positive power terminal of the battery 130 and the positive charging terminal of the battery charger 140 are electrically connected at a first node N1, and the negative input terminal of the DC/AC inverter 120, the negative power terminal of the battery 130 and the negative charging terminal of the battery charger 140 are electrically connected at a second node N2.

Further, the portable power system 100 can be configured such that output terminals of the DC/AC inverter 120 are electrically connected to first input terminals of the transfer switch 150, and a power source input 170, such as, a male 3-prong electrical connector or a power cord can be electrically connected to second input terminals of the transfer switch 150. In addition, the power source input 170 can be electrically connected to input terminals of the battery charger 140. Output terminals of the transfer switch 150 can be electrically connected to a power outlet 160, such as, a standard household power outlet or GFI power outlet.

In the configuration shown in FIG. 1, the battery 130 of the portable power system 100 can be charged via standard household power or by a generator that produces standard household power. In this configuration, the standard household power can also be provided at the power outlet 160. For example, while the power source input 170 of the system is electrically connected to live household power, the battery 130 can be charged and the live household power can be provided to the power outlet 160 via the transfer switch 150. In this mode, the DC/AC inverter 120 is deactivated by the transfer switch 150. Once the live household power is no longer supplied to the power source input 170 or the system 100 is unplugged or disconnected from the live household power, the transfer switch 150 activates the DC/AC inverter 120 such that inverted household power is delivered to the power outlet 160. In this mode, the DC/AC inverter 120 provides power at the proper voltage and frequency as that of household power. When the household power is restored to the portable power system 100, the transfer switch 150 once again provides household power to the power outlet 160 and charges the battery 130 as required. Thus, the transfer switch 150 can be configured to provide one of an inverted current or a household current to the power outlet 160 of the portable power system 100.

An optional circuit breaker 440, such as, a resettable circuit breaker or a fused circuit breaker can be provided between the power source input 170 and the battery charger 140 and the second input terminals of the transfer switch 150.

The DC/AC inverter 120 can comprise a dc/dc sub-converter and a dc/ac sub-converter. The dc/dc sub-converter may be configured to boost the input voltage of the DC/AC inverter 120 to a household voltage range, and the dc/ac sub-converter may be configured to convert the boosted DC voltage to an AC waveform at or near the same amplitude and frequency as household power. The DC/AC inverter 120 may comprise an optional status indicator 405 for indicating the status of the DC/AC inverter 120. For example, the status indicator 405 can comprise one or more light emitting devices for indicating an overload condition and/or fault condition, and can comprise an indicator 405 to indicate whether the inverter is currently operating. The portable power system 100 can further comprise an on/off switch 410 electrically connected to the DC/AC inverter that is capable of controlling an operational mode of the DC/AC inverter 120.

The battery 130 can comprise various types of rechargeable batteries. In some embodiments, the battery 130 comprises one or more sealed lead acid batteries, such as, AGM or Gel type. In other embodiments, the battery 130 comprises one or more lithium-ion type batteries. The battery 130 may have an amp/hour rating ranging between 50 amp/hours and 100 amp/hours. Further, an optional battery charge indicator 420 can be electrically connected to the battery 130 for indicating a charge of the battery 130.

Figure 6:
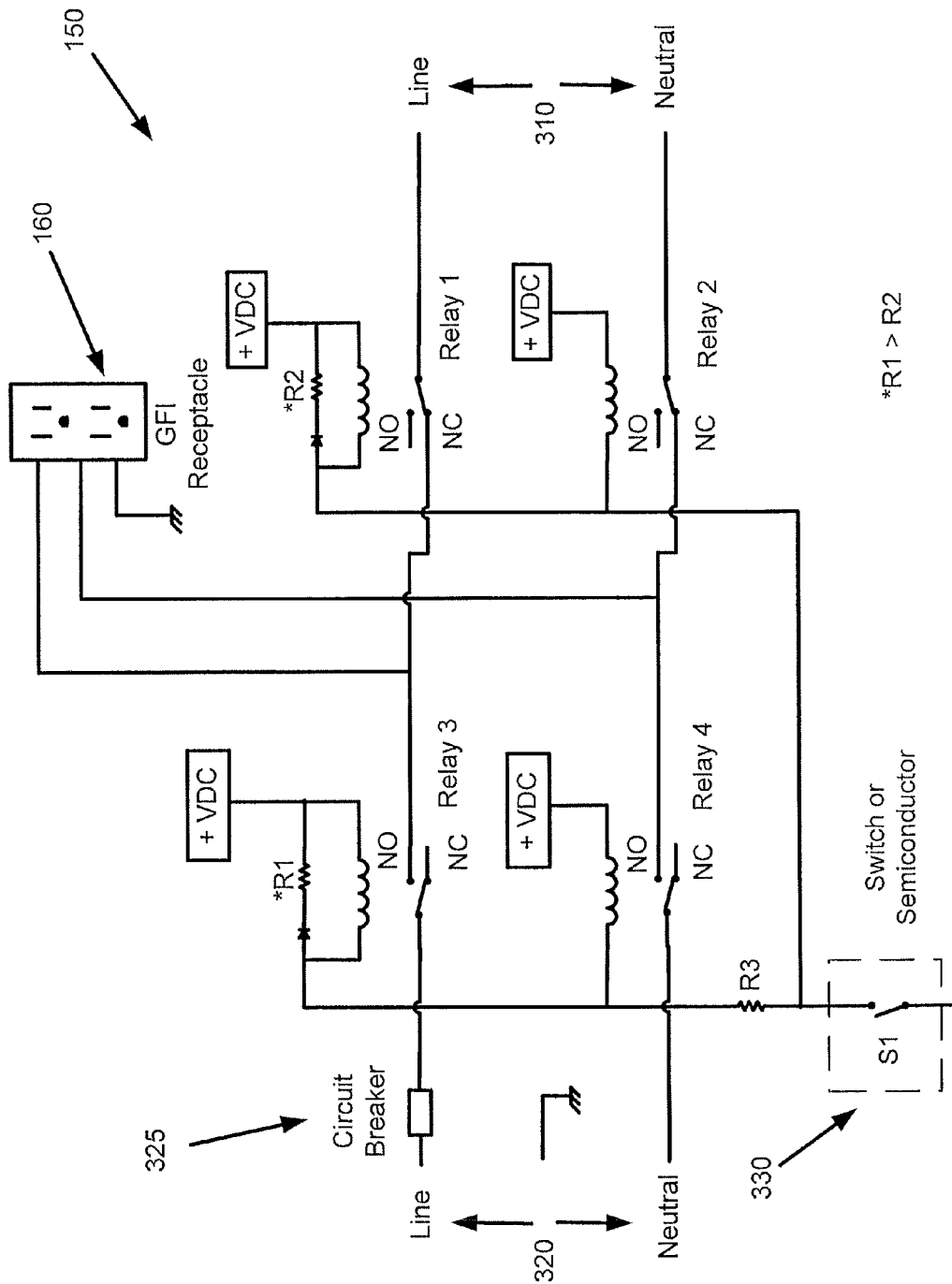
FIG. 6 is a schematic diagram of a transfer switch, in accordance with embodiments of the present inventive concepts.

The transfer switch 150 can comprises a transfer switch configured in a "break-before-make" configuration, such as, for example, the transfer switch 150 shown in FIG. 6. The transfer switch 150 can comprise a plurality of electromechanical devices, such as, relays, solid state switches, transistors and/or silicon-controlled rectifiers.

The portable power system 100 can be configured in various sizes so as to meet the power requirements of its user. For example, in some embodiment the portable power system 100 is of a weight less than or equal to 70 pounds. In other embodiments, the portable power system 100 is of a weight less than or equal to 100 pounds.

Figure 2:
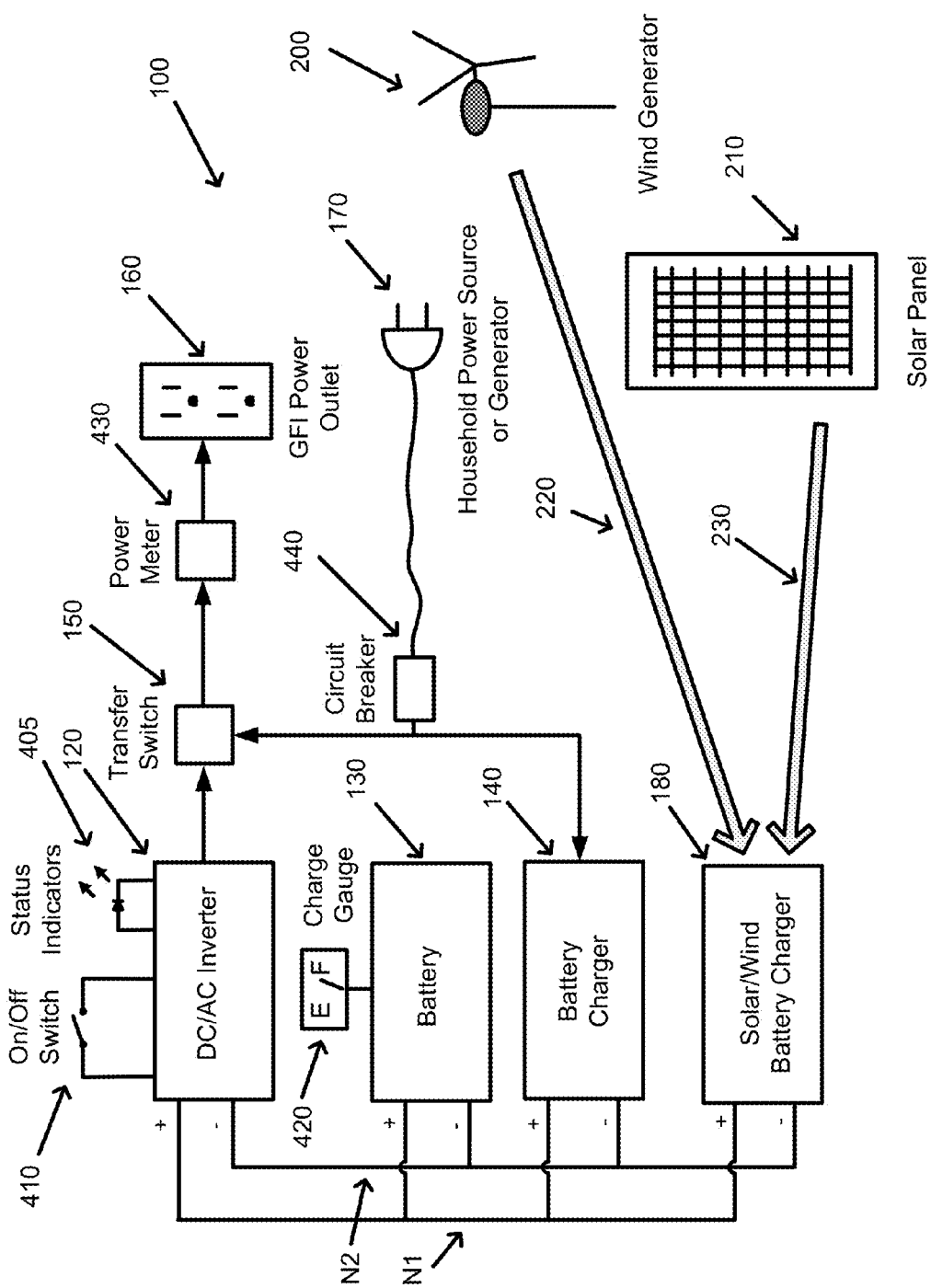
FIG. 2 is another block diagram of a portable power system, in accordance with embodiments of the present inventive concepts.

FIG. 2 is a block diagram of a portable power system, in accordance with embodiments of the present inventive concepts. The portable power system 100 illustrated at FIG. 2 includes elements similar to those described above with respect to FIG. 1, thus their description will not be repeated.

The portable power system 100 can further comprise an alternative power source battery charger 180, which can be electrically connected to the battery 130. For example, in the exemplary portable power system 100 shown in FIG. 2, the positive input terminal of the DC/AC inverter 120, the positive power terminal of the battery 130, the positive charging terminal of the battery charger 140 and the positive charging terminal of the alternative power source battery charger 180 are electrically connected at a first node N1, and the negative input terminal of the DC/AC inverter 120, the negative power terminal of the battery 130, the negative charging terminal of the battery charger 140 and the negative charging terminal of the alternative power source battery charger 180 are electrically connected at a second node N2.

A renewable power generation source, such as, a wind generator 200 and/or a solar panel 210, can be electrically connected to the alternative power source battery charger 180. The renewable power generation source can be electrically connected via electrical connecting lines 220, 230 to the alternative power source battery charger 180 so that the battery 130 of the portable power system 100 can be charged.

Figure 3:
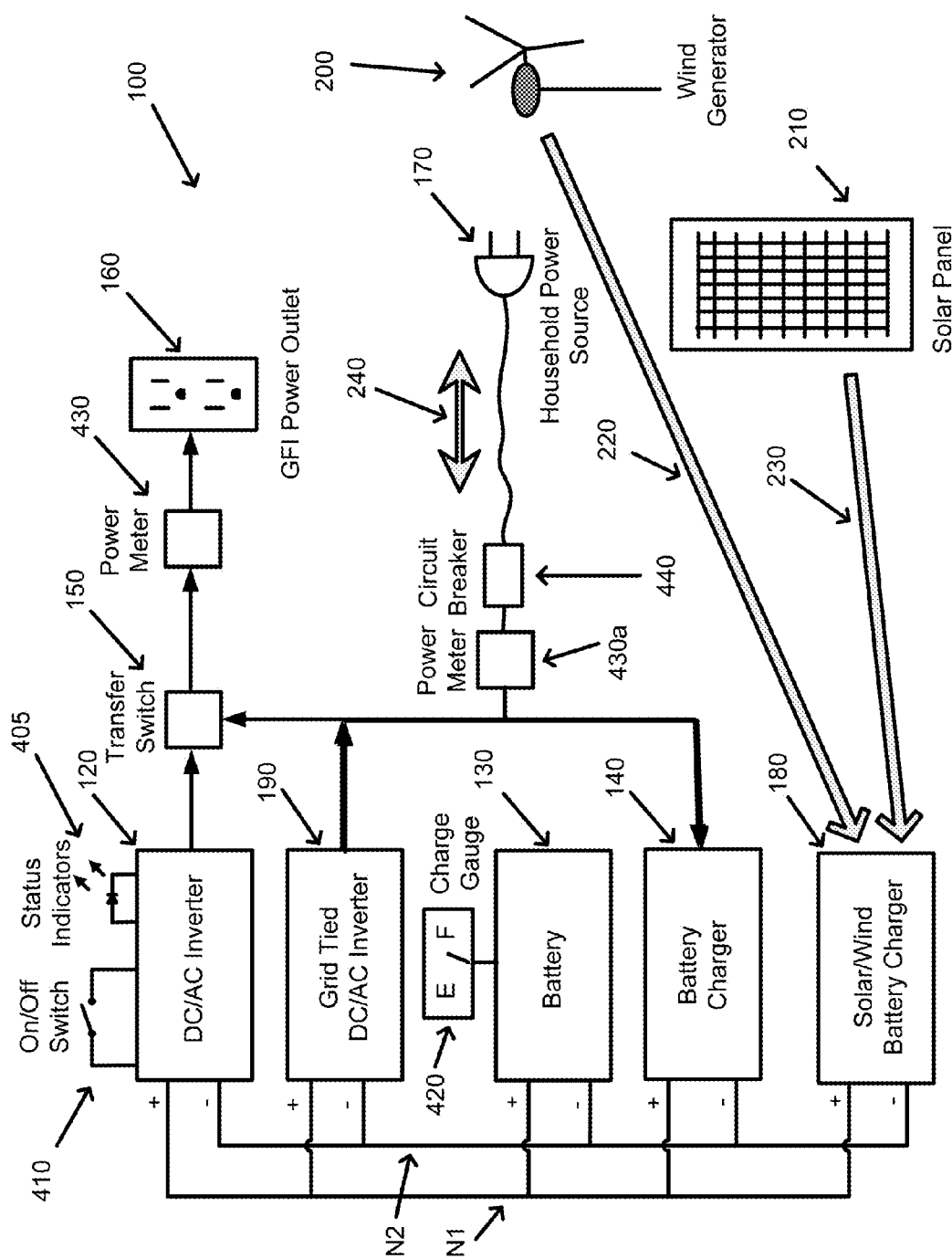
FIG. 3 is yet another block diagram of a portable power system, in accordance with embodiments of the present inventive concepts.

FIG. 3 is a block diagram of a portable power system, in accordance with embodiments of the present inventive concepts. The portable power system 100 illustrated at FIG. 3 includes elements similar to those described above with respect to FIGS. 1 and 2, thus their description will not be repeated.

The portable power system 100 can further comprise a grid tied DC/AC inverter 190, which can be electrically connected to the first and second nodes N1, N2. The grid tied DC/AC inverter 190 can be configured to convert a direct current supplied by the battery 130 and/or the alternative power source battery charger 180 to an alternating current, which can be transferred to the household power circuit or grid via the household power connection 170. For example, excess power from the renewable power generation source can be transferred to the household electrical grid when the battery 130 is fully charged.

Figure 4:
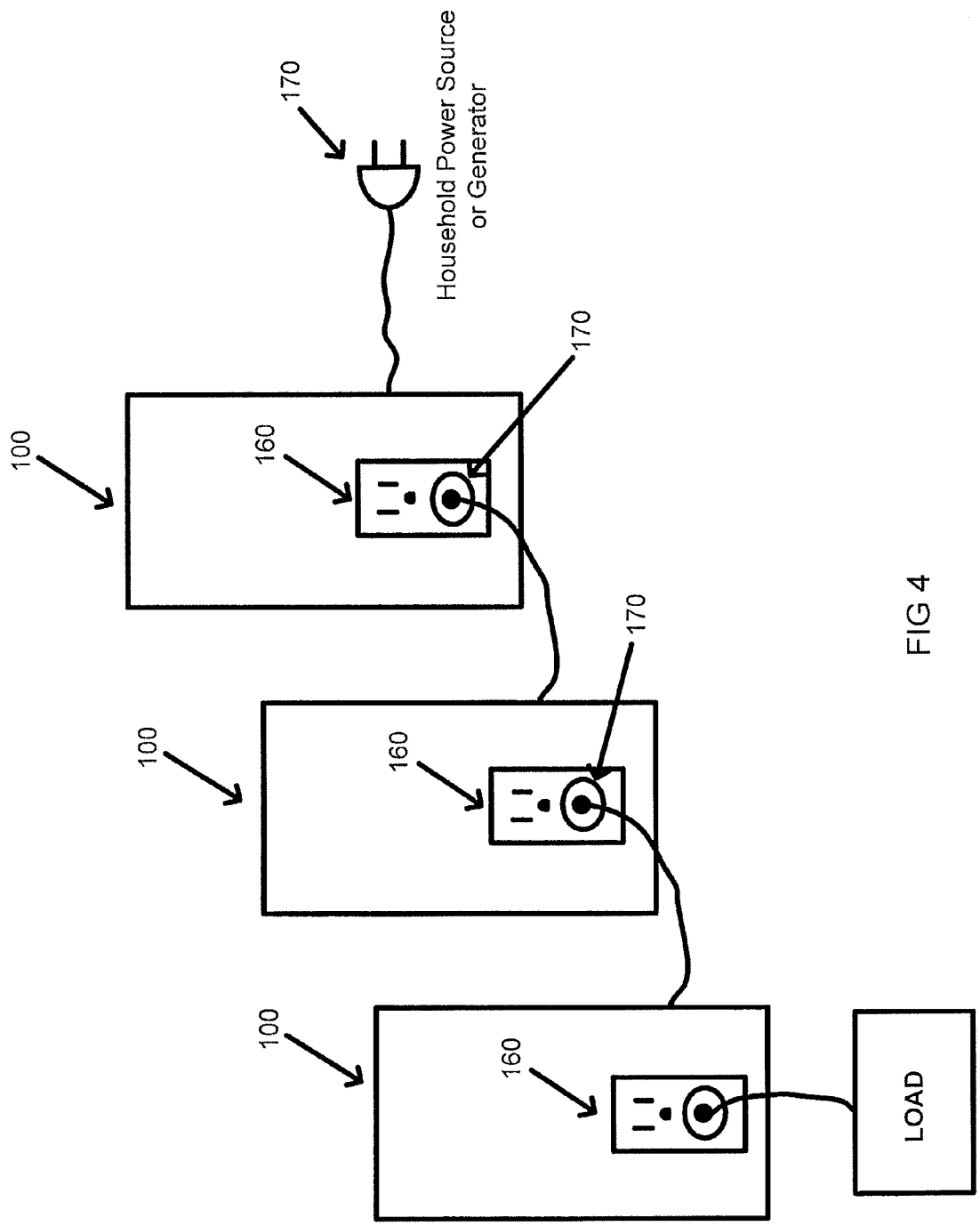
FIG. 4 is a block diagram of a plurality of portable power systems configured in a cascading configuration, in accordance with embodiments of the present inventive concepts.

FIG. 4 is a block diagram of a plurality of portable power systems configured in a cascading configuration, in accordance with embodiments of the present inventive concepts. A plurality of portable power systems 100 can be can be cascaded or placed in a series configuration to extend the amount of time a load may be powered. This configuration also allows several units to be charged at the same time or in parallel from a single household power source or generator connection.

For example, when the cascaded systems are disconnected from a household power source or generator and when powering a load, the unit furthest from the load (e.g., unit 1) will discharge it's battery first. The units (e.g., units 2, 3, ext . . . ) plugged into the furthest unit from the load (e.g., unit 1) will pass inverted current to the load via adjacent upstream units (e.g., unit 2, unite 3). The upstream units (e.g., unit 2, unit 3) transfer the inverted current via the transfer switch located in each of the upstream units as if the upstream units were connected to a household power source of generator. When the furthest unit from the load (e.g., unit 3) has fully discharged its battery, it will turn off. The next unit, for example, unit 2, which is plugged into the unit that just turned off, will then power the load from its internal battery. This sequence will continue until the last unit (i.e., unit most proximal to the load), which is powering the load, fully discharges its internal battery.

In this manner, once the furthest unit from the load (e.g., unit 1) is discharged, the unit can be removed from the series of cascaded systems, while the load is still being powered, so that the discharged unit can be removed and recharged. For example, the discharged unit can be removed from the series of cascaded units and recharged at another location.

When the household power or generator is reconnected to the cascaded systems, all the units will charge their internal batteries at the same time, and the transfer switch in each of the units will pass the household power along to adjacent units, allowing the load to be powered by the household power or generator.

Figure 5:
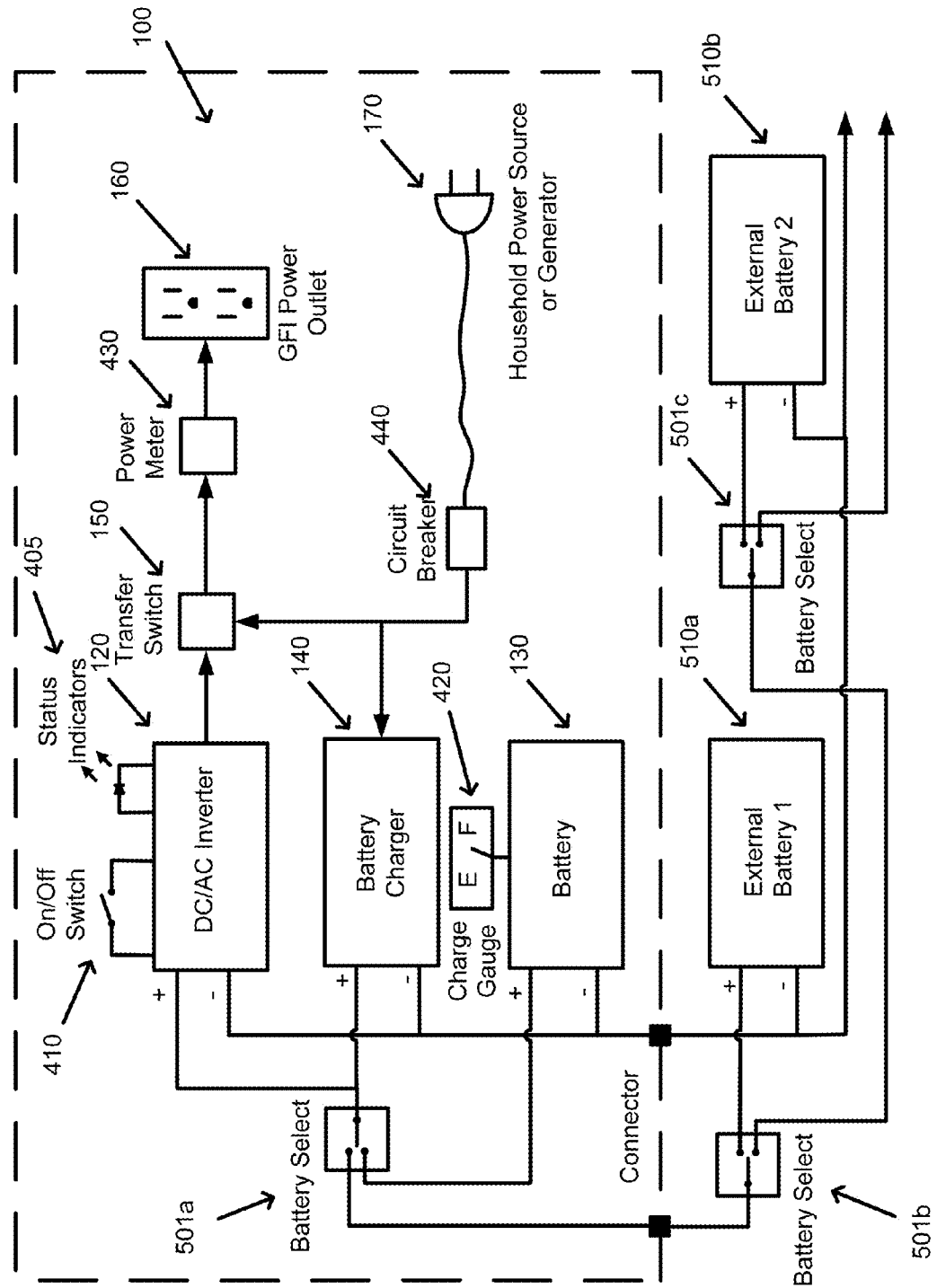
FIG. 5 is a block diagram of a portable power system, in accordance with embodiments of the present inventive concepts.

FIG. 5 is a block diagram of a portable power system, in accordance with embodiments of the present inventive concepts. The portable power system 100 illustrated at FIG. 5 includes elements similar to those described above with respect to FIGS. 1, 2 and 3, thus their description will not be repeated. Although not shown, all elements of FIGS. 2 and 3 can be incorporated into the embodiment disclosed in FIG. 5.

The portable power system 100 can further comprise one or more external batteries 510*a-b* so that the power capacity of the portable power system 100 can be increased. The internal and external batteries can be connected in parallel by one or more battery selector switches 501*a-c*. In this manner, the external batteries 510*a-b* can power the portable power system 100 or can be charged via the portable power system 100.

FIG. 6 is a schematic diagram of a transfer switch, in accordance with embodiments of the present inventive concepts. In some embodiments, the transfer switch 150 is configured as a "two-pole break-before-make" transfer switch so that the two power sources (e.g., household power source input 320 and DC/AC inverted current input 310) are isolated at all times. The transfer switch 150 can also be configured as two-fault tolerant, meaning that two failures must occur before any damage can be sustained to other system 100 components. For example, a single component failure of the transfer switch 150 will prove the system inoperative in a fail-safe mode so that the operator can be alerted to a functional problem before any damage can occur. A circuit breaker 325 and/or a GFI receptacle 160 can also be provided to add further safety features to the system 100.

The transfer switch 150 is configured such that when switch S1 is open, inverted current supplied at the DC/AC inverted current input 310 is directed to the output receptacle 160 via a first relay (Relay 1) and a second relay (Relay 2). That is, the contacts of the first and second relays (Relays 1 and 2) are closed contacts. In this configuration, the household power source input 320 is isolated by third and fourth relays (Relays 3 and 4). That is, the contacts of the third and fourth relays (Relays 3 and 4) are open contacts.

When switch S1 is closed, the first and second relays (Relays 1 and 2) close immediately, disconnecting the DC/AC inverted current input 310 from the output receptacle 160. The third and fourth relays (Relays 3 and 4) are delayed coming on as a result of resistor R3. This provides a "break before make function." Once the third and fourth relays (Relays 3 and 4) close, the household power source input 320 is connected to the output receptacle 160 and the DC/AC inverted current input 310 is isolated.

The switch S1 can be activated in response to live household power being available at the household power source input 320. That is, if household power at a proper voltage and/or frequency is available at the input 320 of the transfer switch 150, switch S1 is closed. In some embodiments, live household power can be detected by a voltage sensor and/or a AC line sensor 330. The voltage sensor and/or AC line sensor 330 may also be configured to activate or deactivate the DC/AC inverter 120 in response to the household power 320 being available at the transfer switch 150.

Subsequently, the opening of switch S1 results in a small delay for the third and fourth relays (Relays 3 and 4) to change state. However, there is a longer delay for the first and second relays (Relays 1 and 2) to change state when compared to the third and forth relays (Relays 3 and 4). This occurs when resistor R1 is larger than resistor R2. A smaller resistor R2 creates a longer delay in the magnetic field collapse in the first and second replays (Relays 1 and 2), thus providing again "a break before make function." That is, when the coils of Relay 1 and Relay 2 are tied together, the voltage in each coil is the same; the same holds true for the third and fourth relays (Relays 3 and 4). When the magnetic field collapses in either coil, a voltage is induced across the relay coils. The amount of voltage is dependent on the resistor across the coil. The larger the resistance, the higher the voltage across the coils, which causes the field to collapse at a faster rate since the voltage across the coil is defined as: Vcoil=dI/dT. Making R1 a larger value than R2 allows the coil voltage of the third and fourth relays (Relays 3 and 4) to be larger, thus discharging faster than the combination of the coil and R2 in the first and second relays (Relays 1 and 2). Thus, the "break-before-make" time delay values can be adjusted by changing the values of R1 and R2.

In some embodiments the transfer switch 150 is configured with a time delay that ranges between about 10 msec to 15 msec for the first and second relays (Relays 1 and 2), and about 2 msec to 8 msec for the third and forth relays (Relays 3 and 4). In this configuration, the relays may switch at about 10 msec to 15 msec max, which allows a void of about two cycles of 60 Hz household power during state changes of the transfer switch 150.

The transfer switch 150 can be manufactured in an economical fashion by using circuit board relays. For example, the relays (Relays 1-4) of the transfer switch 150 may include one or more relays similar to a T90 series circuit board relay manufactured by Tyco Electronics.

Figure 7:
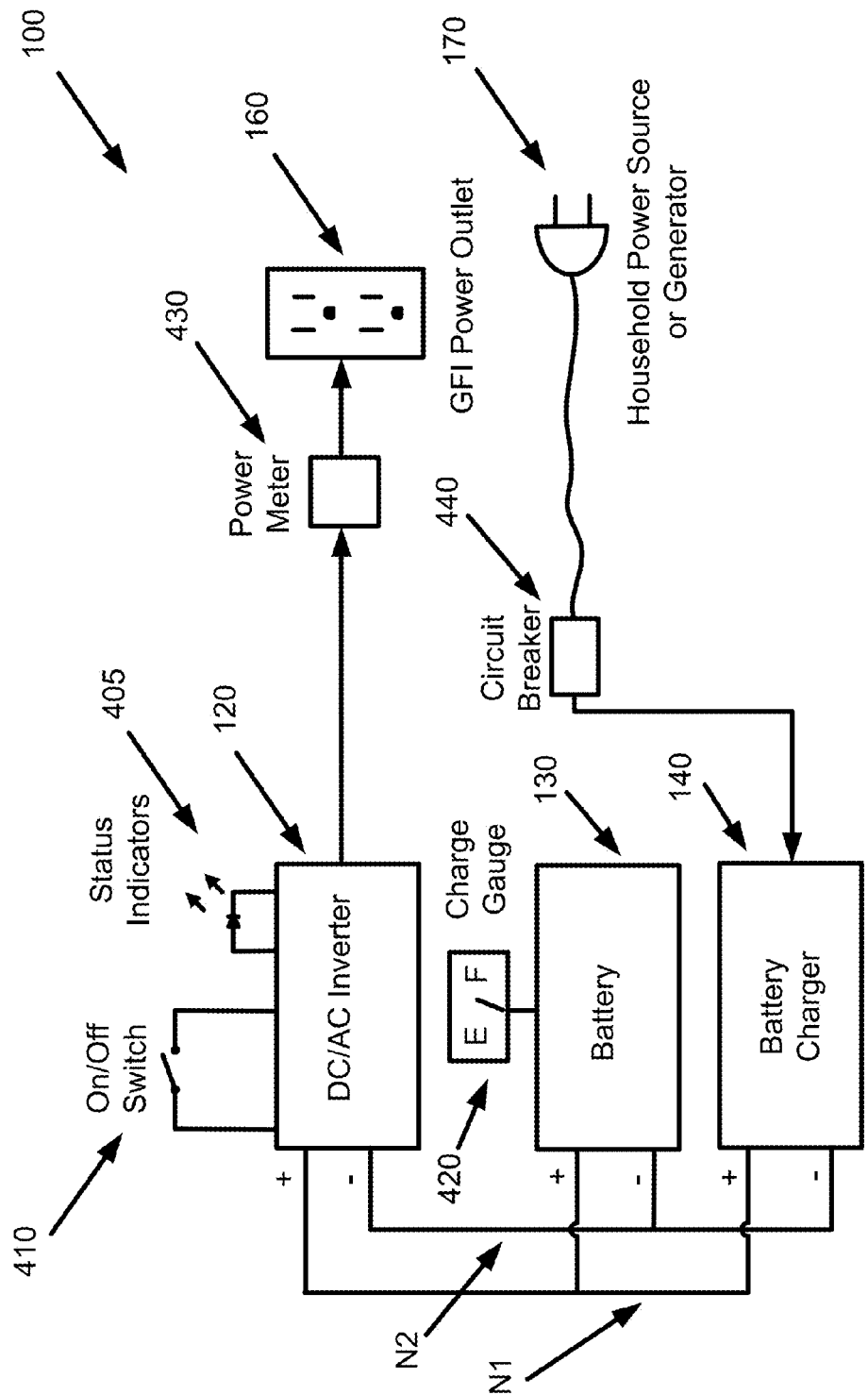
FIG. 7 is yet another block diagram of a portable power system, in accordance with embodiments of the present inventive concepts.

FIG. 7 is a block diagram of a portable power system, in accordance with embodiments of the present inventive concepts. The portable power system 100 illustrated at FIG. 7 includes elements similar to those described above with respect to FIG. 1, thus their description will not be repeated.

The portable power system 100 can be configured such that power terminals of the battery 130 are electrically connected to input terminals of the DC/AC inverter 120 and output terminals of the battery charger 140. For example, in the exemplary portable power system 100 shown in FIG. 7, the positive input terminal of the DC/AC inverter 120, the positive power terminal of the battery 130 and the positive output terminal of the battery charger 140 are electrically connected at a first node N1, and the negative input terminal of the DC/AC inverter 120, the negative power terminal of the battery 130 and the negative output terminal of the battery charger 140 are electrically connected at a second node N2.

Further, the portable power system 100 can be configured such that output terminals of the DC/AC inverter 120 are electrically connected to a power outlet 160, such as, a standard household power outlet or GFI power outlet. A power meter 430 may be provided at the output of the DC/AC inverter 430 so that the power consumption of a load (connected to the power outlet 160) can be determined. In addition, the power source input 170 can be electrically connected input terminals of the battery charger 140. An optional circuit breaker or fuse 440 may be coupled between the battery charger 140 and the power source input 170.

In the configuration shown in FIG. 7, the battery 130 of the portable power system 100 can be charged via standard household power or by a generator that produces standard household power. In this configuration, the DC/AC inverter 120 may deliver an inverted power to the power outlet 160. While the portable power system 100 is connected to live household power or generator power, the battery 130 can be charged and the DC/AC inverter may convert a DC current output by the battery 130 and/or the battery charger 130 to an inverted household current, which can be provided at the power outlet 160. In this configuration, a load connected to the power outlet 160 is isolated from the charging power source (e.g. live household power), which allows the load to be uninterrupted and unaffected by the charging power source during and after charging of the battery 130.

Figure 8:
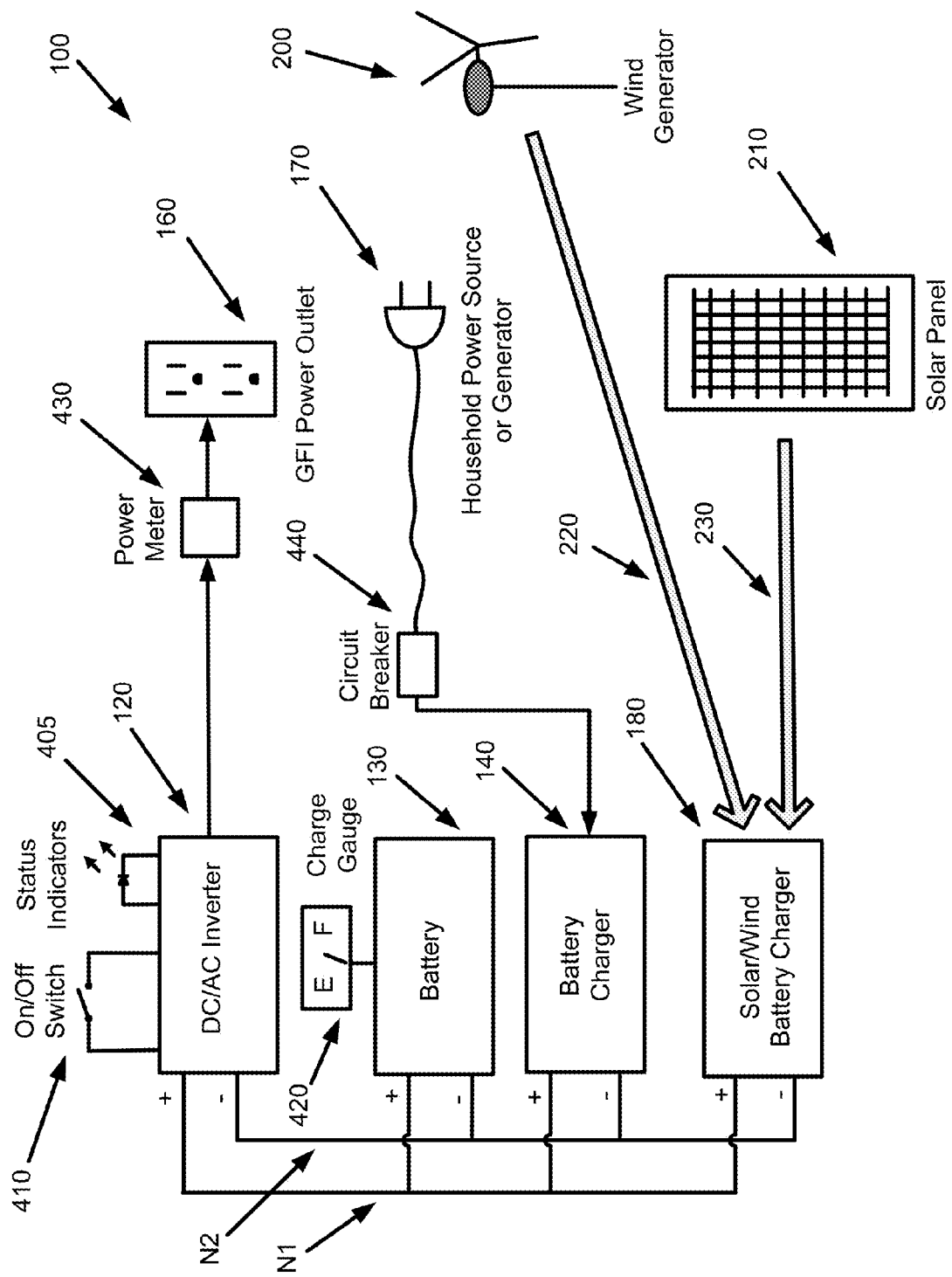
FIG. 8 is yet another block diagram of a portable power system, in accordance with embodiments of the present inventive concepts.

FIG. 8 is a block diagram of a portable power system, in accordance with embodiments of the present inventive concepts. The portable power system 100 illustrated at FIG. 8 includes elements similar to those described above with respect to FIGS. 1, 2 and 7 thus their description will not be repeated.

The portable power system 100 can further comprise an alternative power source battery charger 180, which can be electrically connected to the battery 130. For example, in the exemplary portable power system 100 shown in FIG. 8, the positive input terminal of the DC/AC inverter 120, the positive power terminal of the battery 130, the positive output terminal of the battery charger 140 and the positive charging terminal of the alternative power source battery charger 180 are electrically connected at a first node N1, and the negative input terminal of the DC/AC inverter 120, the negative power terminal of the battery 130, the negative output terminal of the battery charger 140 and the negative charging terminal of the alternative power source battery charger 180 are electrically connected at a second node N2.

A renewable power generation source, such as, a wind generator 200 and/or a solar panel 210, can be electrically connected to the alternative power source battery charger 180. The renewable power generation source can be electrically connected via electrical connecting lines 220, 230 to the alternative power source battery charger 180 so that the battery 130 of the portable power system 100 can be charged. In this manner, the battery 130 of the portable power system 100 can be charged independently of a community power grid.

Figure 9:
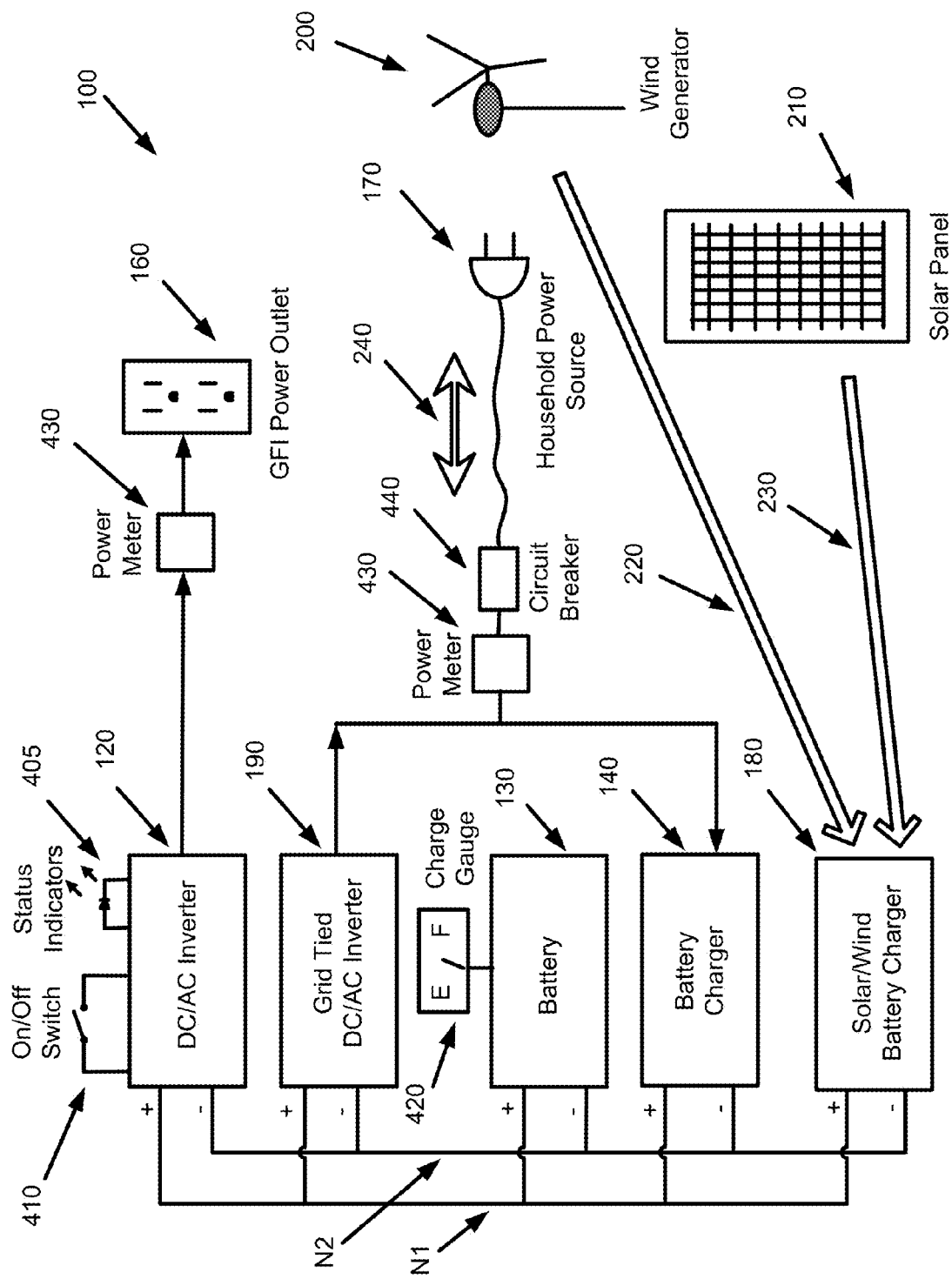
FIG. 9 is yet another block diagram of a portable power system, in accordance with embodiments of the present inventive concepts.

FIG. 9 is a block diagram of a portable power system, in accordance with embodiments of the present inventive concepts. The portable power system 100 illustrated at FIG. 9 includes elements similar to those described above with respect to FIGS. 1-3, 7 and 8, thus their description will not be repeated.

The portable power system 100 can further comprise a grid tied DC/AC inverter 190, which can be electrically connected to the first and second nodes N1, N2. The grid tied DC/AC inverter 190 can be configured to convert a direct current supplied by the battery 130 and/or the alternative power source battery charger 180 to an alternating current, which can be transferred to the household power circuit or grid via the household power connection 170. For example, excess power from the renewable power generation source can be transferred to the household electrical grid when the battery 130 is fully charged.

Figure 10:
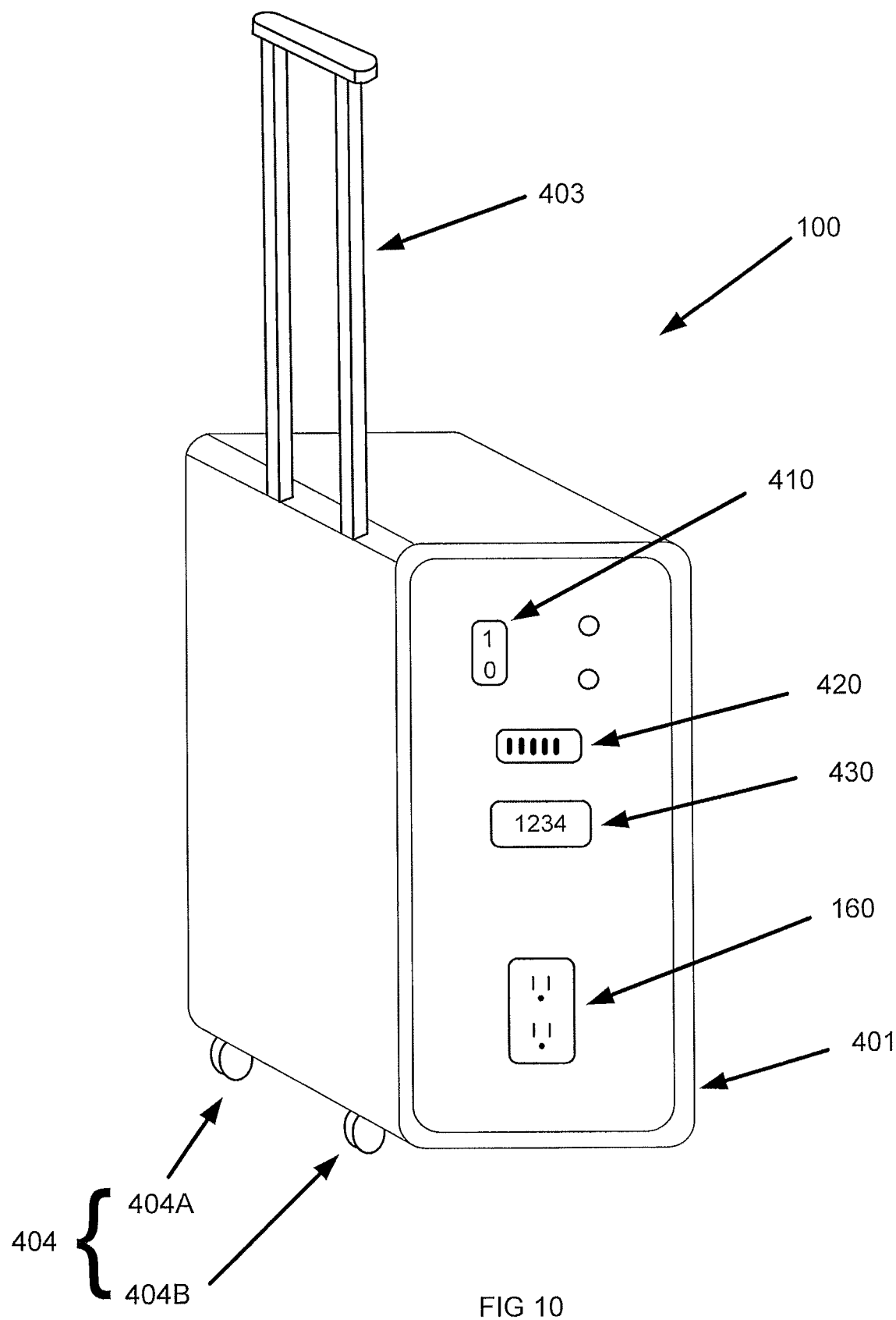
FIGS. 10-12 are perspective views of a portable power system, in accordance with embodiments of the present inventive concepts.
Figure 11:
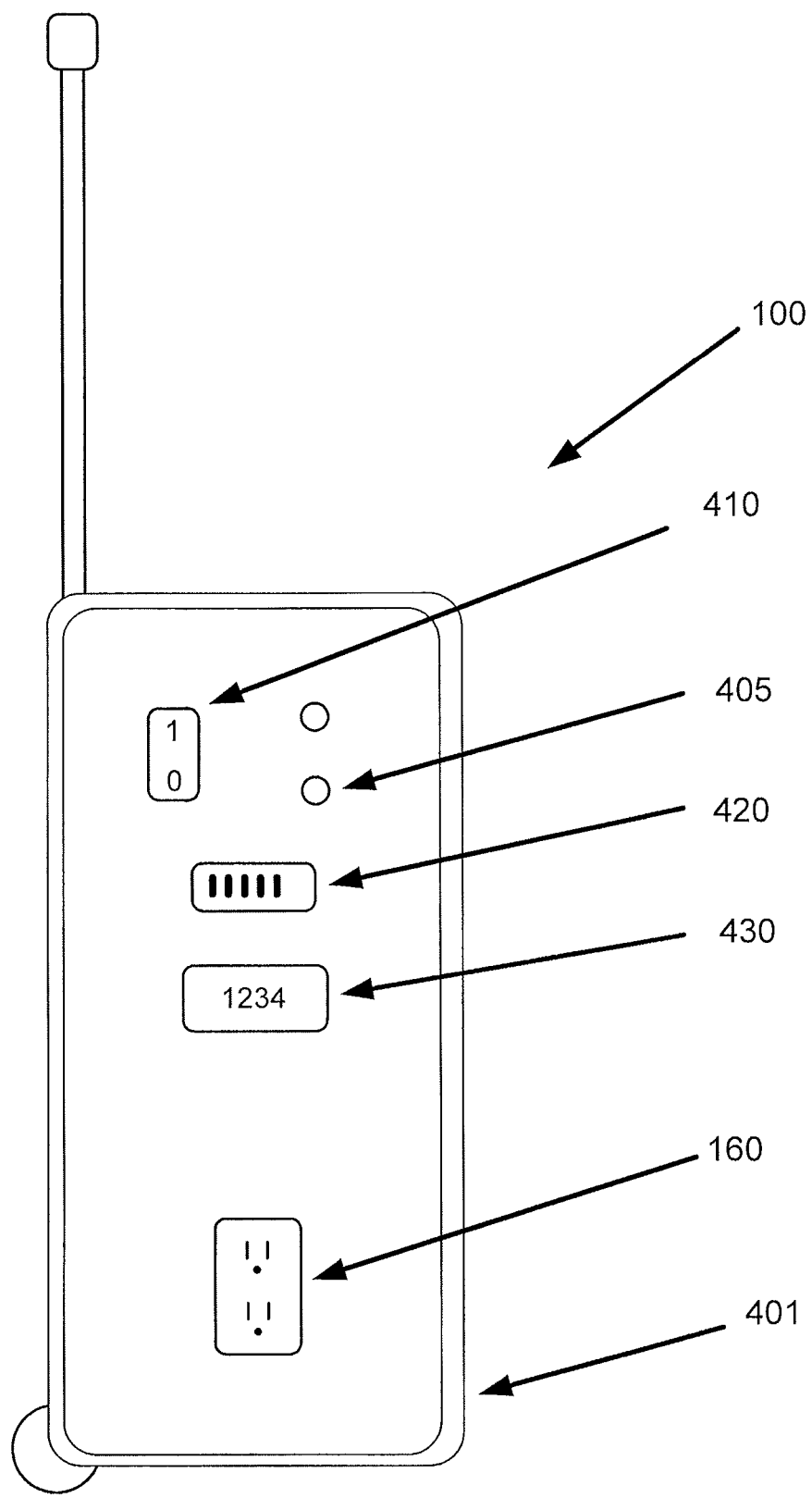
Figure 12:
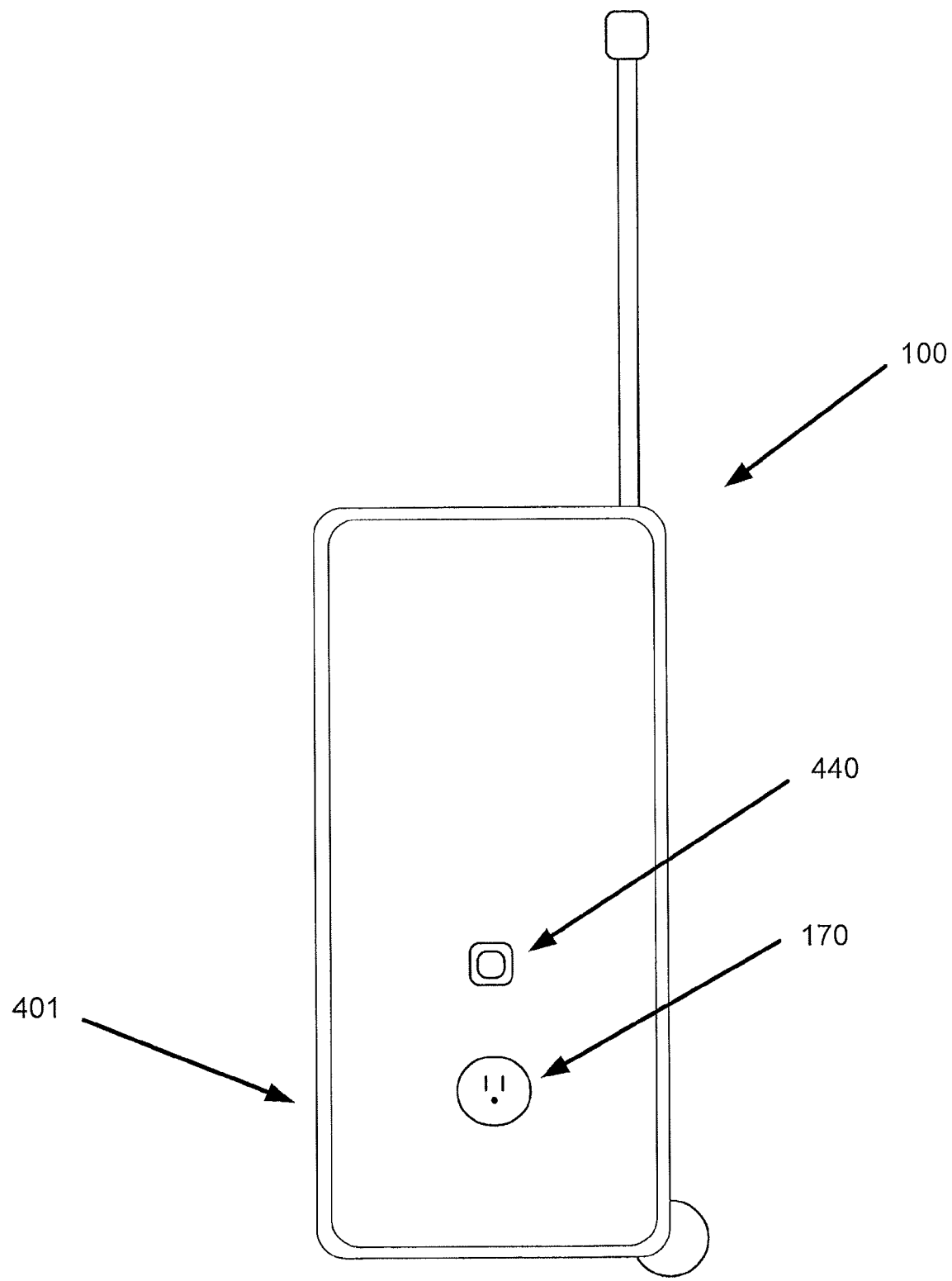

FIGS. 10-12 are perspective views of a portable power system, in accordance with embodiments of the present inventive concepts. A portable power system 100 can be packaged in a movable enclosure that includes two or more wheels 404 and a telescoping handle 403 so that the system can be easily portable.

Referring to FIGS. 10 and 11, the DC/AC inverter status indicators 405, the on/off switch 410, the battery charge indicator 420 and the power level indicator 430 can be mounted to a front panel 401 of the enclosure. The power outlet 160 can also be secured to the enclosure such that at least one female household electrical connection is accessible from the front panel 401 of the enclosure.

Referring to FIG. 12, the optional circuit breaker 440 and the power source input 170 can be mounted to a rear panel 402 of the enclosure. In this embodiment, the power source input 170 comprises a male 3-prong charging port, which can be connected to a standard household power extension cord.

Figure 13:
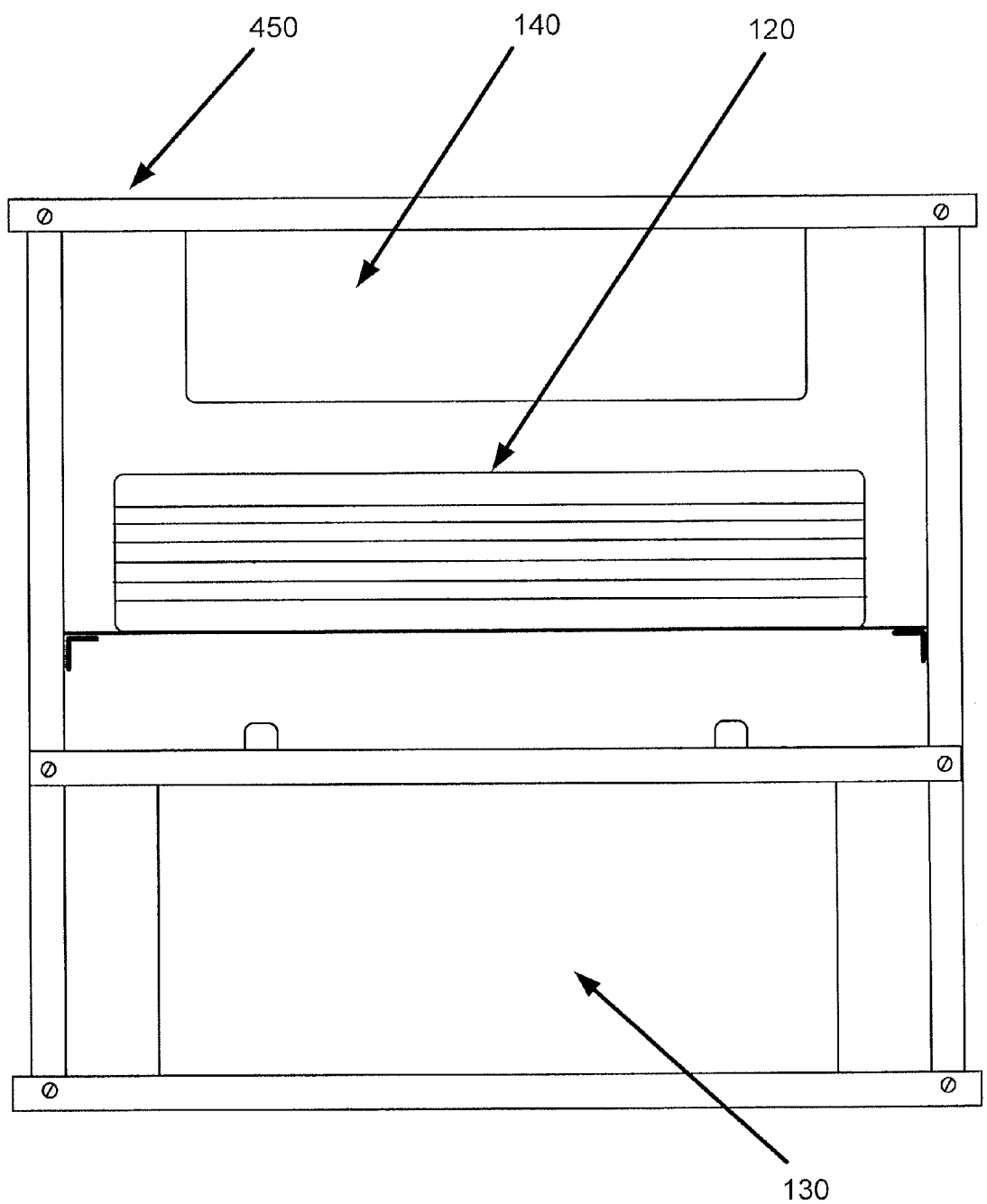
FIG. 13 illustrates a chassis of a portable power system, in accordance with embodiments of the present inventive concepts.

FIG. 13 illustrates a chassis of a portable power system, in accordance with embodiments of the present inventive concepts. Components of the portable power system 100, such as, the DC/AC inverter 120, the battery 130, and the battery charger 140 and the transfer switch 150 can be mounted to a chassis 450, which can be removably secured within the enclosure of the portable power system 100. In some embodiments, the chassis 450 comprises extruded aluminum brackets that are coupled together via one or more fasteners.

Figure 14:
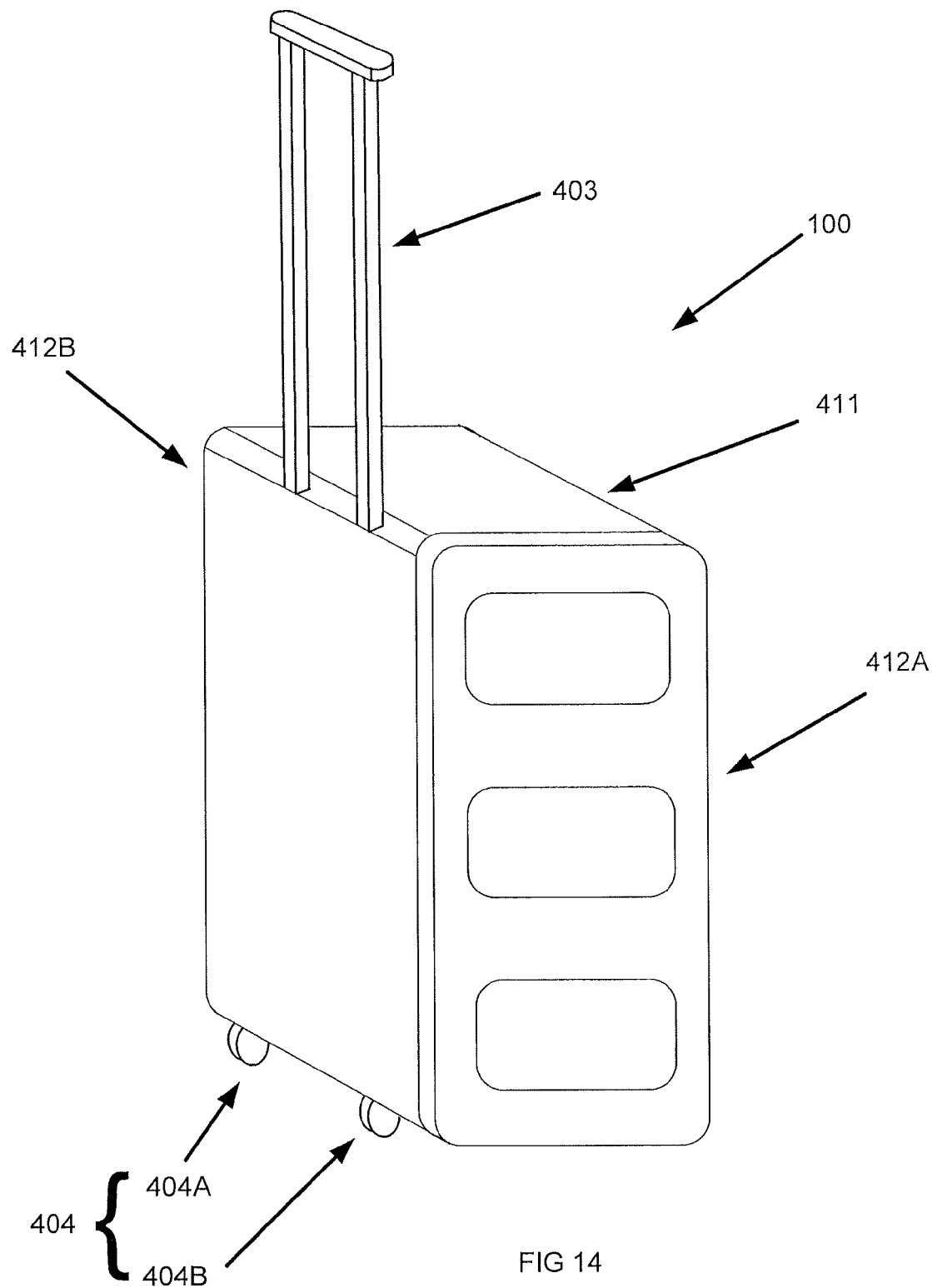
FIGS. 14 and 15 are perspective views of an enclosure of a portable power system, in accordance with embodiments of the present inventive concepts.
Figure 15:
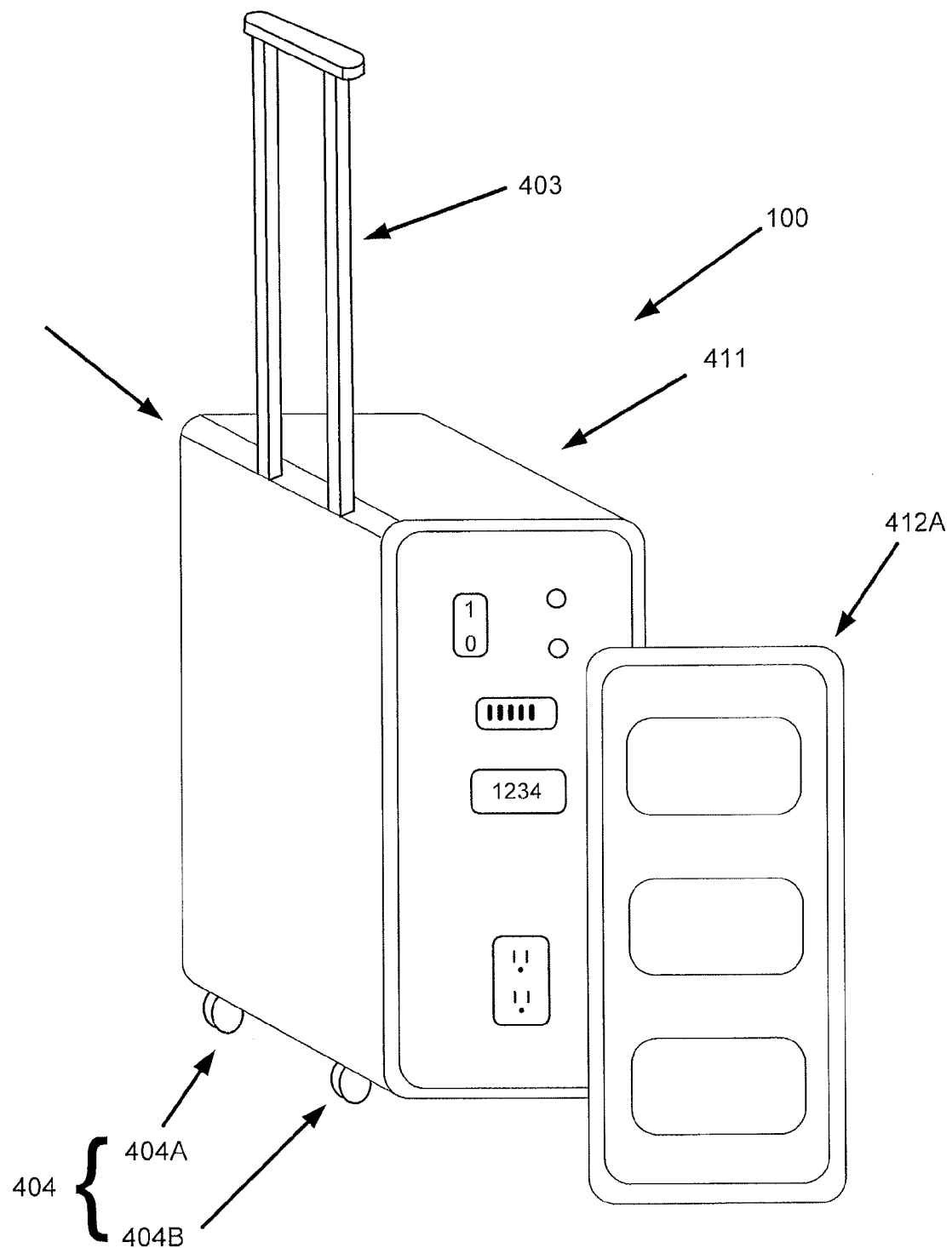

FIGS. 14 and 15 are perspective views of an enclosure of a portable power system, in accordance with embodiments of the present inventive concepts. The enclosure of the portable power system 100 can comprise a shell 411 and one or more removable side panels 412a-b. The shell 411 and the one or more removable side panels can comprise a plastic material, which may be formed according to various molding techniques known in the art.

The shell 411 and removable side panels 412a-b of the enclosure may be colored so that the portable power system 100 can be more easily distinguished during household power failures/outages. For example, the shell 411 and the removable side panels 412a-b may be formed of blue, red or yellow colored plastic. Additionally or optionally, reflective material strips may be provided on exterior surfaces of the enclosure.

Referring to FIG. 15, the shell 411 and the removable side panels 412a-b of the enclosure define a cavity 414 for insertion of the chassis 450 shown and described in FIG. 13. The enclosure may comprise a rugged enclosure constructed and arranged to protect the electrical components and systems secured within the cavity 414. In some embodiments, the enclosure is water resistant.

Figure 16:
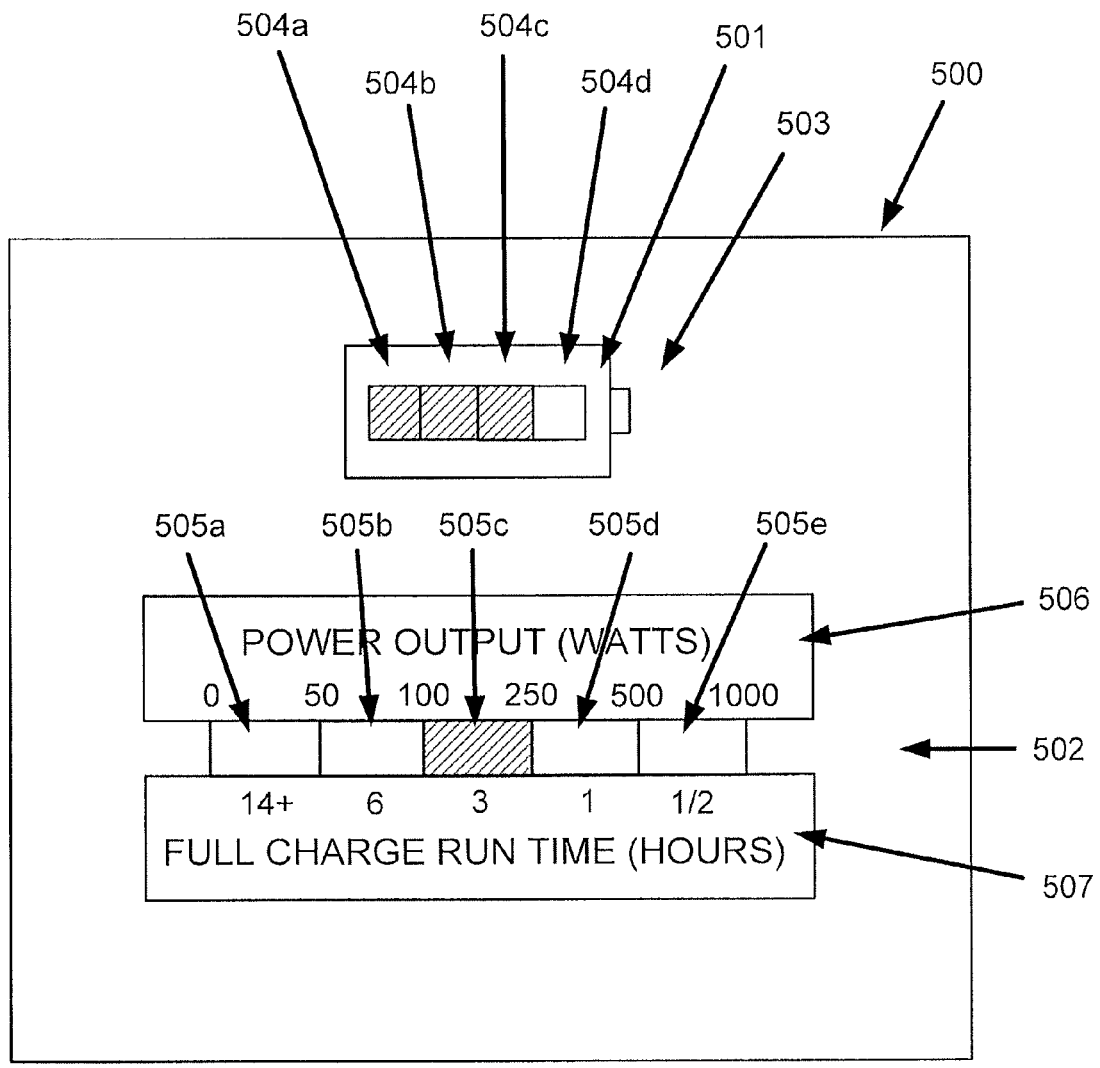
FIG. 16 is a diagram of a power and run time indicator of a portable power system, in accordance with embodiments of the present inventive concepts.

FIG. 16 is a diagram of a power and run time display of a portable power system, in accordance with embodiments of the present inventive concepts. The power and run time display 500 is configured to display both power output of a portable power system 100 and estimated full battery charge run time of the portable power system 100 simultaneously. The power and run time display 500 is also configured to display a current charge level of the portable power system's battery. In this manner, the power and run time display 500 can provide a real time estimation of both the power that is delivered to a load connected to the portable power system 100 and the amount of time the portable power system 100 will operate before fully discharging its battery.

The power and run time display 500 comprises a battery charge indicator 501 and a power output and run time indicator 502. The battery charge indicator 501 is configured to indicate a current charge of the portable power system's battery, and may include one or more light emitting devices, such as light emitting diodes, which are arranged in accordance with a battery charge marker 503. In the exemplary power and run time display 500 shown in FIG. 16, the battery charge indicator 501 includes first through forth light emitting devices 504a-d, which each corresponding to a linear charge level of the portable power system's battery (e.g., 25%, 50%, 75%, 100%). In this example, the first through third light emitting devices 504a-c are illuminated to indicate that the portable power system's battery is approximately 75% charged.

The power output and run time indicator 502 is configured to indicate power output of a portable power system 100 and estimated full battery charge run time of the portable power system 100 simultaneously, and may include one or more light emitting devices, such as light emitting diodes. The one or more light emitting devices are arranged between a power output marker 506 and a full charge run time marker 507. In the exemplary power and run time display 500 shown in FIG. 16, the power output and run time indicator 502 includes first through fifth light emitting devices 505a-e, which each correspond to a non-liner power output level or level range (e.g., 0 to 50 watts, 50 to 100 watts, 100 to 250 watts, 250 to 500 watts, 500 to 1000 watts) and a non-linear full charge run time level (e.g., 16 hours, 8 hours, 4 hours, 1 hour, ½ hour). In this example, the third light emitting device 505c is illuminated to indicate that the portable power system can operate on battery power for approximately 4 hours at a power output ranging between 100 to 250 watts when fully charged. Thus, in the present example a user can determine the remaining operational time of the portable power system by multiplying the indicated charge level of the battery (i.e., 75%) by the estimated full charge run time (i.e., 4 hours) to determine the system's present estimated run time (i.e., 3 hours).

The terminology used herein is for the purpose of describing particular embodiments and is not intended to be limiting of the inventive concepts. It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A portable power supply system, comprising:
a movable enclosure;
a battery secured within the enclosure;
a battery charger secured within the enclosure, the battery charger electrically connected to the battery for charging the battery;
a DC/AC inverter secured within the enclosure, the DC/AC inverter electrically connected to the battery and configured to convert a direct current supplied by the battery to an alternating current;
a power outlet including at least one household electrical connection;
a transfer switch secured within the enclosure, the transfer switch being electrically connected to the DC/AC inverter, the battery charger, the power outlet and a power source input, wherein when household power is supplied to the power source input, the transfer switch is configured to supply the household power to the battery charger and the power outlet, and when the household power is unavailable at the power source input, the transfer switch is configured to supply the alternating current generated by the DC/AC inverter to the power outlet; and
a power and run time display that is configured to display a current power output level of the portable power supplying system and an estimated full battery charge run time of the portable power system simultaneously.

2. The portable power supply system of claim 1, wherein the enclosure further comprises at least one wheel mounted to a bottom region of the enclosure and an extendable handle disposed at an upper region of the enclosure.

3. The portable power supply system of claim 1, wherein the power and run time display includes a plurality of light emitting devices arranged between a power output marker and a full charge run time marker, the power output marker including a plurality of non-linear power output level markers, and the full charge run time marker including a plurality of non-linear full charge run time level markers.

4. The portable power supply system of claim 1, wherein the power and run time display includes a battery charge indicator configured to indicate a current charge of the battery, the battery charge indicator including a plurality of light emitting devices that are each arranged to correspond with one of a plurality of battery charge level markers.

5. The portable power supply system of claim 1, wherein the alternating current generated by the DC/AC inverter is a household alternating current.

6. The portable power supply system 1, wherein the power outlet is secured to the enclosure such that the at least one household electrical connection is accessible from a front panel of the enclosure.

7. The portable power supply system of claim 1, wherein the at least one household electrical connection comprises a first female household electrical connection and a second female household electrical connection.

8. The portable power supply system of claim 1, wherein the power outlet is a GFI household power outlet.

9. The portable power supply system of claim 1 further comprising:
an alternative power source battery charger secured within the enclosure, the alternative power source battery charger electrically connected to the battery for charging the battery; and
a renewable power generation source electrically connected to the alternative power source battery charger.

10. The portable power supply system of claim 9, wherein the renewable power generation source comprises a solar panel.

11. The portable power supply system of claim 9, wherein the renewable power generation source comprises a wind turbine.

12. The portable power supply system of claim 9 further comprising a grid tied DC/AC inverter secured within the enclosure, the grid tied DC/AC converter electrically connected to the battery and the alternative power source battery charger so that the grid tied DC/AC inverter is capable of converting a direct current supplied by the battery or the alternative power source battery charger to an alternating current, and
wherein the grid tied DC/AC inverter is configured to transfer excess power from the renewable power generation source to a household electrical grid connected to the power source input when the battery is fully charged.

13. A power and run time display comprising:
a plurality of light emitting devices arranged between a power output marker and a full charge run time marker, the power output marker including a plurality of non-linear power output level markers, and the full charge run time marker including a plurality of non-linear full charge run time level markers,
wherein the power and run time display is configured to illuminate one of the plurality light emitting devices corresponding to one of the plurality of non-linear power output level markers and one of the plurality of non-linear full charge run time level markers so that a current power consumption level of a device and an estimated full battery charge run time of the device is simultaneously displayed to a viewer.

14. The portable power supply system of claim 13, wherein the power and run time display includes a battery charge indicator configured to indicate a current charge of the battery, the battery charge indicator including a plurality of light emitting devices that are each arranged to correspond with one of a plurality of battery charge level markers.

15. A portable power supply system, comprising:
a movable enclosure;
a battery secured within the enclosure;
a battery charger secured within the enclosure, the battery charger electrically connected to the battery for charging the battery;
a DC/AC inverter secured within the enclosure, the DC/AC inverter electrically connected to the battery and configured to convert a direct current supplied by the battery to an alternating current;
a power outlet including at least one household electrical connection;
a transfer switch secured within the enclosure, the transfer switch being electrically connected to the DC/AC inverter, the battery charger, the power outlet and a power source input, wherein when household power is supplied to the power source input, the transfer switch is configured to supply the household power to the battery charger and the power outlet, and when the household power is unavailable at the power source input, the transfer switch is configured to supply the alternating current generated by the DC/AC inverter to the power outlet; and
a power and run time display that is configured to display a current power output level of the portable power supplying system and an estimated full battery charge run time of the portable power system simultaneously,
wherein the power and run time display includes a plurality of light emitting devices arranged between a power output marker and a full charge run time marker, the power output marker including a plurality of non-linear power output level markers, and the full charge run time marker including a plurality of non-linear full charge run time level markers, and wherein the power and run time display includes a battery charge indicator configured to indicate a current charge of the battery, the battery charge indicator including a plurality of light emitting devices that are each arranged to correspond with one of a plurality of battery charge level markers.

16. A portable power supply system, comprising:

an enclosure;

a battery secured within the enclosure;

a battery charger secured within the enclosure, the battery charger electrically connected to the battery for charging the battery;

a DC/AC inverter secured within the enclosure, the DC/AC inverter electrically connected to the battery and configured to convert a direct current supplied by the battery to an alternating current;

a power outlet electronically connected to the DC/AC inverter; and a power and run time display that is configured to display a current power output level of the portable power supplying system and an estimated full battery charge run time of the portable power system simultaneously.

17. The portable power supply system of claim 16, wherein the power and run time display includes a plurality of light emitting devices arranged between a power output marker and a full charge run time marker, the power output marker including a plurality of non-linear power output level markers, and the full charge run time marker including a plurality of non-linear full charge run time level markers.

18. The portable power supply system of claim 16, wherein the power and run time display includes a battery charge indicator configured to indicate a current charge of the battery, the battery charge indicator including a plurality of light emitting devices that are each arranged to correspond with one of a plurality of battery charge level markers.

19. The portable power supply system of claim 16 further comprising:

an alternative power source battery charger secured within the enclosure, the alternative power source battery charger electrically connected to the battery for charging the battery; and a renewable power generation source electrically connected to the alternative power source battery charger.

* * * * *